(12) United States Patent
Woods et al.

(10) Patent No.: US 10,824,551 B2
(45) Date of Patent: Nov. 3, 2020

(54) BULK DATA TRANSFER OVER MDIO (CLAUSE 45) BUS

(71) Applicants: David Woods, Ottawa (CA); Mark Wight, Ottawa (CA); Gerard Swinkels, Ottawa (CA)

(72) Inventors: David Woods, Ottawa (CA); Mark Wight, Ottawa (CA); Gerard Swinkels, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/384,358

(22) Filed: Apr. 15, 2019

(65) Prior Publication Data

US 2019/0317890 A1    Oct. 17, 2019

Related U.S. Application Data

(60) Provisional application No. 62/658,142, filed on Apr. 16, 2018.

(51) Int. Cl.
*G06F 12/02* (2006.01)
*G06F 13/16* (2006.01)

(52) U.S. Cl.
CPC ...... *G06F 12/0207* (2013.01); *G06F 13/1642* (2013.01); *G06F 13/1689* (2013.01)

(58) Field of Classification Search
CPC .................................................. G06F 12/0207
See application file for complete search history.

(56) References Cited

U.S. PATENT DOCUMENTS

| 2007/0101043 | A1* | 5/2007 | Herman | G06F 13/4004 710/315 |
| 2007/0170909 | A1* | 7/2007 | Vorenkamp | H04B 3/44 324/76.11 |
| 2015/0339253 | A1* | 11/2015 | Chen | G06F 13/364 710/110 |

OTHER PUBLICATIONS

"Excerpt from "IEEE Standard for Ethernet"", IEEE Std 802.3-2015, pp. 707-708, Sep. 3, 2015.

* cited by examiner

*Primary Examiner* — Edward J Dudek, Jr.
(74) *Attorney, Agent, or Firm* — Integral Intellectual Property Inc.; Miriam Paton; Amy Scouten (57) ABSTRACT

Methods for transfer of bulk data from a leader device to a follower device over a bus are described. The methods employ address frames and write frames. The bus, the address frames, and the write frames are compatible with Clause 45 of IEEE Std 802.3-2015. The methods achieve a reduction in the number of frames employed to transfer data as contrasted with conventional indirect write transactions. After transmitting on a Management Data Input/Output (MDIO) data signal an address frame that specifies the follower device and that contains the address of an initial register, the leader device proceeds to transmit on the MDIO data signal multiple write frames that specify the target follower device, the multiple write frames transmitted one at a time, each write frame containing a different block of the bulk data. A follower device implements a post-write-increment-address action, despite the absence of any definition in Clause 45 of IEEE Std 802.3-2015 of a post-write-increment-address frame.

12 Claims, 5 Drawing Sheets

BULK DATA TRANSFER OVER MDIO (CLAUSE 45) BUS

CROSS-REFERENCE TO PREVIOUS APPLICATION

This application claims the benefit under 35 USC 119(e) of U.S. Provisional Patent Application No. 62/658,142 filed Apr. 16, 2018, the contents of which are hereby incorporated herein by reference in their entirety.

TECHNICAL FIELD

This document relates to the technical field of physical memory storage, and more specifically, to transfer of data over the two-signal Management Data Input/Output (MDIO) Interface specified in Clause 45 of IEEE Std 802.3-2015.

BACKGROUND

Clause 45 of IEEE Std 802.3-2015 defines four types of management frames for the MDIO Interface: address frame, write frame, read frame, post-read-increment-address frame. There is no post-write-increment-address frame defined in Clause 45 of IEEE Std 802.3-2015.

The act of writing a block of data to a target register involves a two-frame indirect write transaction. First, an address frame is used to set an address of the target register. Second, a write frame is used to access the target register whose address is stored in the dedicated address register. The block of data contained in the write frame is written to the target register whose address is stored in the dedicated address register.

Indirect write transactions to write N blocks of data to N target registers employ 2×N frames, where N is a positive integer. This is slow and inefficient.

SUMMARY

Methods for transfer of bulk data from a leader device to a follower device over a bus are described. The methods employ address frames and write frames. The bus, the address frames, and the write frames are compatible with Clause 45 of IEEE Std 802.3-2015. The methods achieve a reduction in the number of frames employed to transfer data as contrasted with conventional indirect write transactions. After transmitting on the bus an address frame that specifies the follower device and that contains the address of an initial register, the leader device proceeds to transmit on the bus multiple write frames that specify the target follower device, the multiple write frames transmitted one at a time, each write frame containing a different block of the bulk data. A follower device implements a post-write-increment-address action, despite the absence of any definition in Clause 45 of IEEE Std 802.3-2015 of a post-write-increment-address frame.

DETAILED DESCRIPTION

Figure 1:
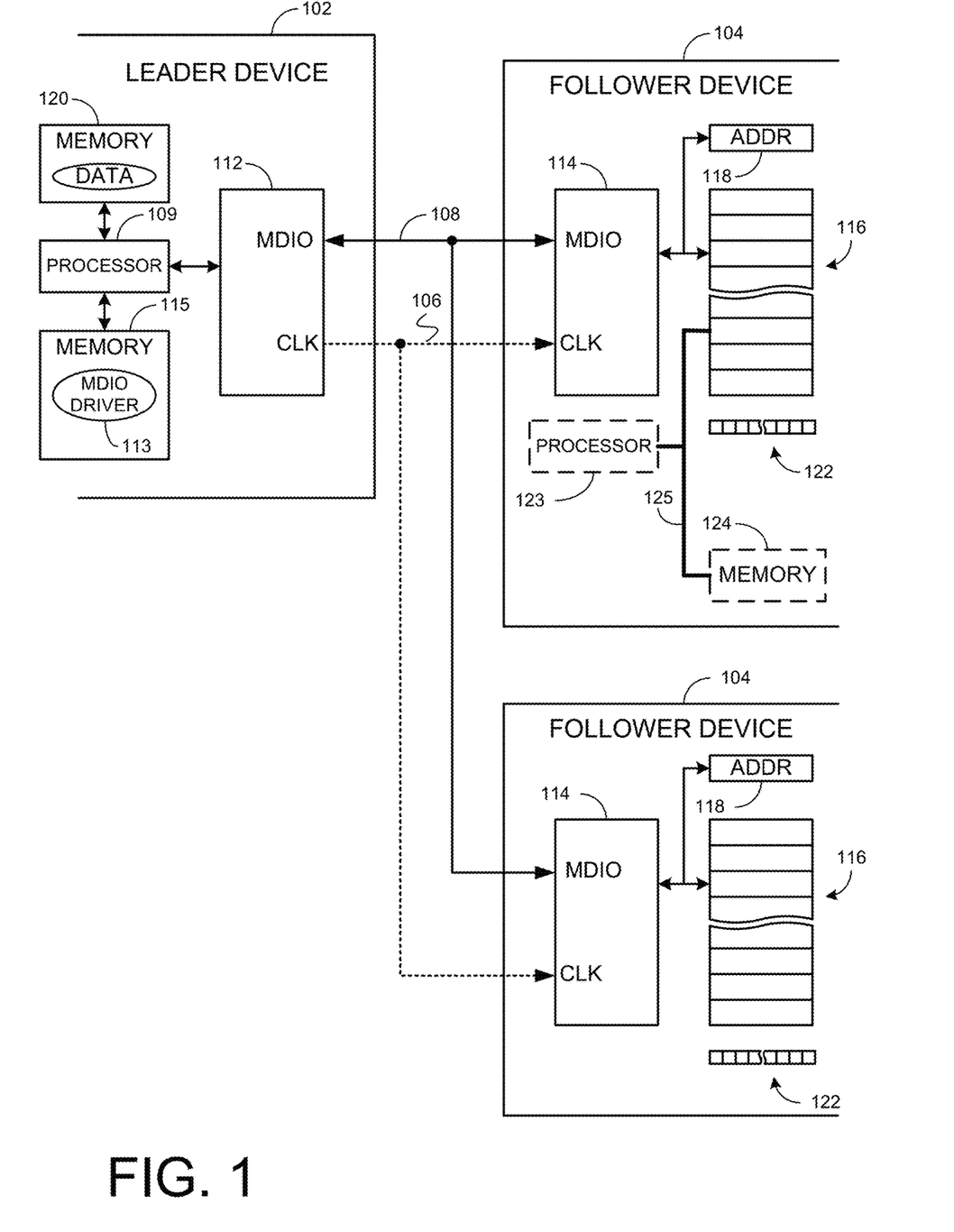
FIG. 1 illustrates a system that comprises a leader device and one or more follower devices that communicate over a bus.

FIG. 1 illustrates a system 100 that comprises a "leader" device 102, one or more "follower" devices 104, and a bus that couples the one or more follower devices 104 to the leader device 102. For simplicity, any other connections between the leader device 102 and the one or more follower devices 104 is ignored. For simplicity, two follower devices 104 are illustrated. The bus is compatible with Clause 45 of IEEE Std 802.3-2015. In Clause 45 of IEEE Std 802.3-2015, a leader device 102 is referred to as a Station Management Entity (STA), and a follower device 104 is referred to as a Management Data Input/Output (MDIO) Management Device (MMD).

The leader device 102 initiates all communication over the bus and is responsible for driving the clock on a clock signal 106, referred to as a Management Data Clock (MDC) signal. The leader device 102 uses a bidirectional data signal 108, referred to as a MDIO data signal, to transmit management frames. Clause 45 of IEEE Std 802.3-2015 defines only four types of management frames for the MDIO Interface: address frame, write frame, read frame, post-read-increment-address frame. A follower device uses the bidirectional data signal 108 to drive data in a read frame or in a post-read-increment-address frame. The "bus" comprises the clock signal 106, the bidirectional data signal 108, and the protocol for using these signals.

A "leader" MDIO interface 112 comprised in the leader device 102 is coupled to the clock signal 106 and to the MDIO data signal 108. The leader device 102 comprises a processor 109, for example, a central processing unit (CPU), able to execute an MDIO driver 113 to operate the "leader" MDIO interface 112. For example, the MDIO driver 113 is executable software stored in a memory 115, for example a read-only memory (ROM) or electrically erasable programmable ROM (EEPROM). The memory 115 is coupled to the processor 109, and the processor is coupled to the leader MDIO interface 112. In each follower device 104, a "follower" MDIO interface 114 is coupled to the clock signal 106 and to the MDIO data signal 108.

The MDIO interfaces 112,114 are used to access 16-bit registers 116 of the one or more follower devices 104. Clause 45 of IEEE Std 802.3-2015 provides for an address space of 65,536 registers in each follower device. Each follower device 104 comprises a dedicated address register 118 that is used to store the 16-bit address of a target register 116 to be accessed. The address frame is used to write the address of a target register 116 to the dedicated address register 118.

A write frame accesses the target register 116 whose address is stored in the dedicated address register 118. A write frame is used to transfer data from the leader device 102 to one of the follower devices 104. The size of a block of data contained in a write frame is 16 bits. Multiple write frames are used to transfer bulk data. The data to be transferred from the leader device 102 may be stored in a memory 120 comprised in or otherwise accessible by the leader device 102. The memory 120 may be random access memory (RAM).

As described in more detail below, a follower device 104 may comprise one or more control registers 122. A control bit of the control register 122 is associated with the address of a corresponding one of the target registers 116.

As described in more detail below, a follower device 104 may optionally comprise a processor 123 and a memory 124, for example, RAM, where the processor 123 is operative to execute instructions to copy the contents of one or more of the target registers 116 using an internal bus 125 to the memory 124. Alternatively, a follower device 104 may optionally comprise the processor 123, where the processor 123 is operative to execute instructions to copy the contents of one or more of the target registers 116 using a communications interface (not shown) to another memory that is external to the follower device 104.

In some systems, the leader device 102 and the one or more follower devices 104 reside on a single printed circuit board (PCB) and the clock signal 106 and the data signal 108 are routed between them on that same single PCB.

In other systems, the leader device 102 and at least one follower device 104 may reside on different PCBs and possibly may reside in different enclosures. The clock signal 106 and the data signal 108 may be routed over any combination of wires, backplanes, PCBs, and the like.

In some of the CFP MSA (C form-factor pluggable multi-source agreement) documents, a leader device 102 is referred to as a host and a follower device 104 is referred to as a module.

Figure 2:
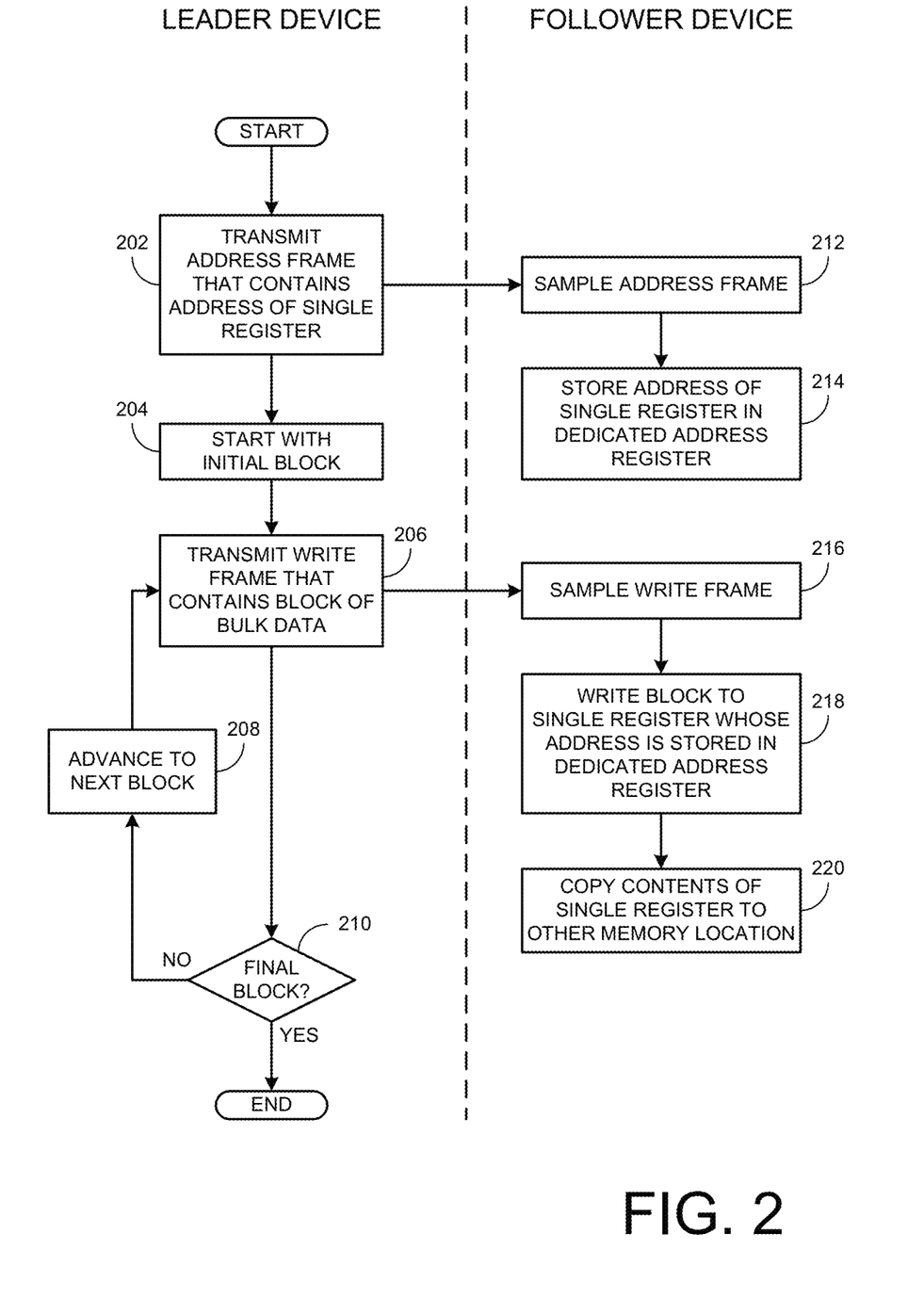
FIG. 2 is a flowchart illustration of a method for bulk data transfer over a bus from a leader device to a single control register of a target follower device.
Figure 3:
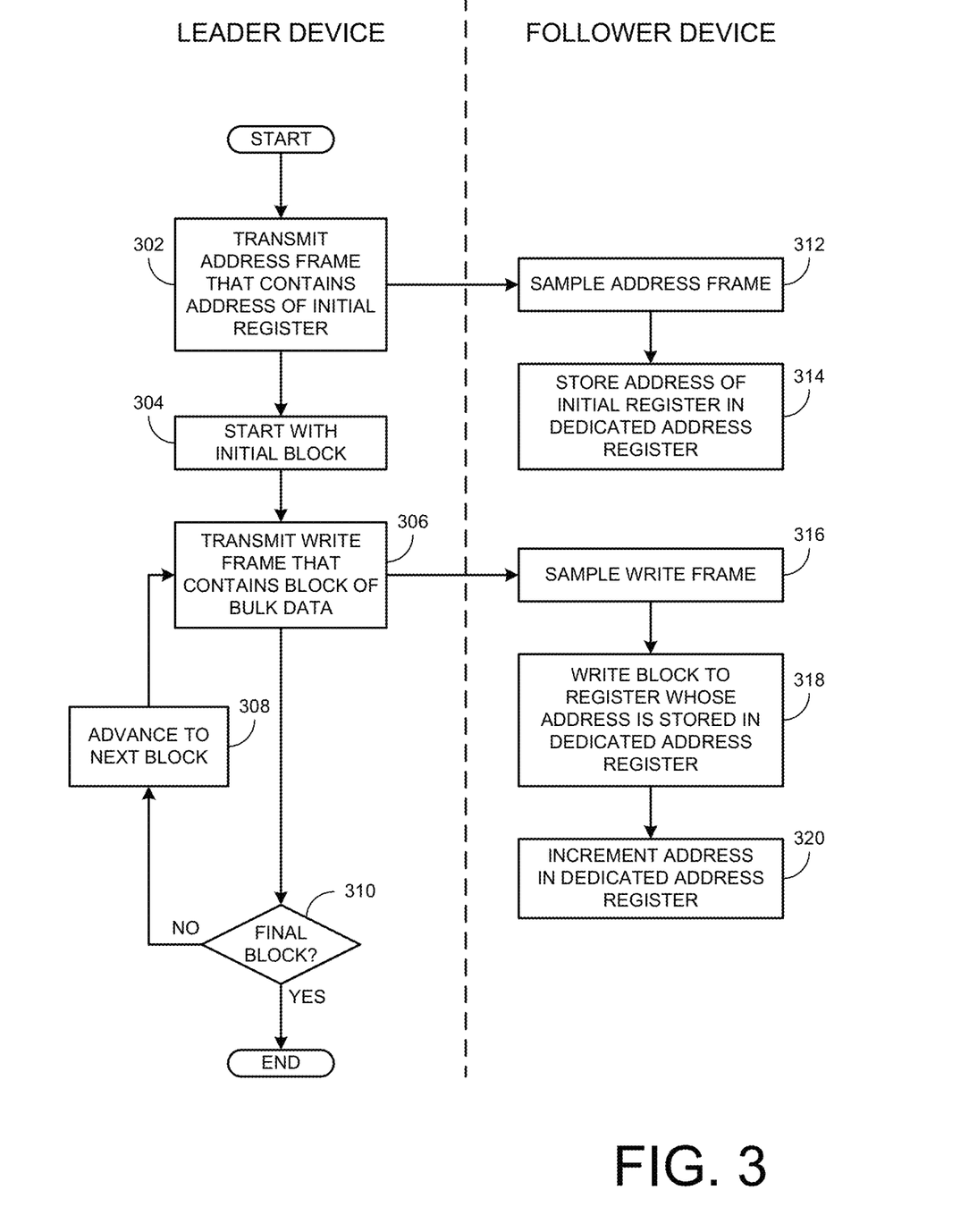
FIG. 3 is a flowchart illustration of a method for bulk data transfer over a bus from a leader device to multiple control registers of a target follower device.
Figure 4:
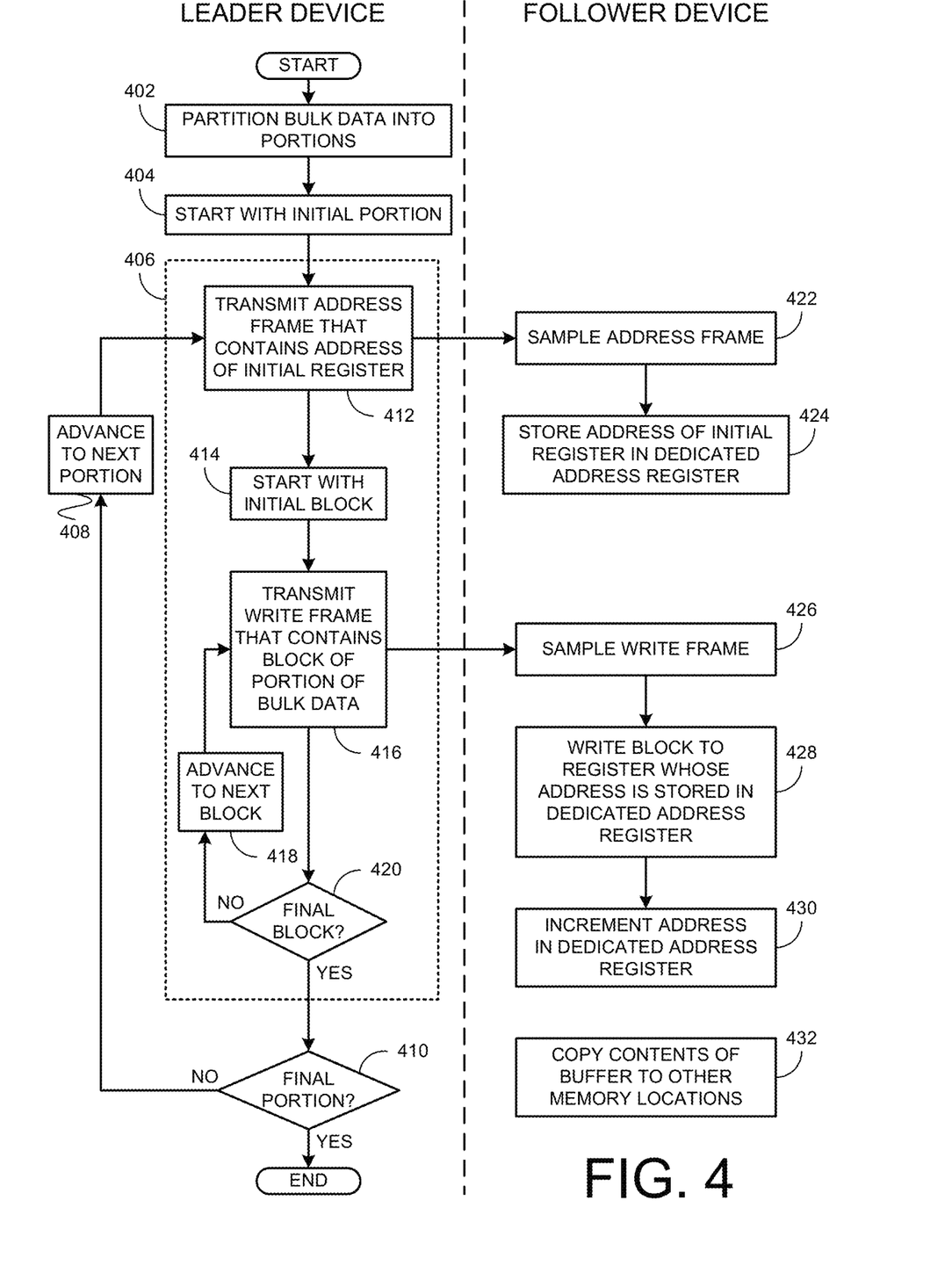
FIG. 4 is a flowchart illustration of another method for bulk data transfer over a bus from a leader device to multiple control registers of a target follower device.

FIG. 2, FIG. 3, and FIG. 4 are flowchart illustrations of various methods for bulk data transfer from a leader device to a target follower device over a bus. The bus and the frames are compatible with Clause 45 of IEEE Std 802.3-2015. Therefore, if the leader device is compatible with Clause 45 of IEEE Std 802.3-2015, implementation of any of the methods illustrated in FIG. 2, FIG. 3, and FIG. 4 will not make the leader device incompatible with Clause 45 IEEE Std 802.3-2015. Similarly, if the target follower device is compatible with Clause 45 of IEEE Std 802.3-2015, implementation of any of the methods illustrated in FIG. 2, FIG. 3, and FIG. 4 will not make the target follower device incompatible with Clause 45 IEEE Std 802.3-2015. These methods are initiated by the leader device. These methods involve the leader device transmitting frames on the MDIO data signal 108, the frames then sampled on the MDIO data signal 108 by the follower devices. Only those frames that specify the target follower device (by port address and device address) are of interest. Any frames sampled by the target follower device on the MDIO data signal 108 that do not specify the target follower device are ignored by the target follower device and are omitted from the following description, even though frames that do not specify the target follower device may be transmitted by the leader device before or after any of the frames that do specify the target follower device. Specifically, the processor 109 executes the MDIO driver 113 to operate the leader MDIO interface 112 to transmit frames over the MDIO data signal 108, and the follower MDIO interface 114 samples the frames on the MDIO data signal 108 and writes to the registers 116.

The method illustrated in FIG. 3 is suitable for configuring multiple registers of the target follower device. For example, configuration of multiple control registers of a target follower device may be accomplished using the method illustrated in FIG. 3. In this context, the size of the bulk data to be transferred does not exceed the capacity of the multiple registers. If there are N 16-bit registers to which the bulk data is transferred, then the size of the bulk data should not exceed 16×N bits, where N is a positive integer that does not exceed 65,536.

The methods illustrated in FIG. 2 and FIG. 4 are suitable for transferring an arbitrary amount of data from the leader device to the target follower device. For example, transfer of a software update to a target follower device may be accomplished using either of the methods illustrated in FIG. 2 and FIG. 4. In another example, transfer of a FPGA configuration file to a target follower device may be accomplished using either of the methods illustrated in FIG. 2 and FIG. 4. In this context, there is no upper limit per se on the size of the bulk data to be transferred.

The method illustrated in FIG. 2 employs P+1 frames to transfer P 16-bit blocks of data from the leader device to a single 16-bit register in the target follower device, where P is a positive integer. The P+1 frames consist of one address frame and P write frames. This can be contrasted with conventional indirect write transactions, which employ 2×P frames to transfer P 16-bit blocks of data. The lower limit on the size of the bulk data to be transferred is two 16-bit blocks of data. That is, P is a positive integer greater than or equal to 2. With this constraint on the size of the bulk data, the method illustrated in FIG. 2 will transfer bulk data from the leader device to the target follower device more quickly and more efficiently than conventional indirect write transactions.

The method illustrated in FIG. 3 employs N+1 frames to transfer N 16-bit blocks of data from the leader device to N target 16-bit registers of the target follower device, where N is a positive integer that does not exceed 65,536. The N+1 frames consist of one address frame and N write frames. This can be contrasted with conventional indirect write transactions, which employ 2×N frames to transfer N 16-bit blocks of data. The lower limit on the size of the bulk data to be transferred is two 16-bit blocks of data. That is, N is a positive integer between 2 and 65,536 (expressed as $2 \leq N \leq 65,536$). With this constraint on the size of the bulk data, the method illustrated in FIG. 3 will transfer bulk data from the leader device to the target follower device more quickly and more efficiently than conventional indirect write transactions.

The method illustrated in FIG. 4 employs N target 16-bit registers of the target follower device, where N is a positive integer that does not exceed 65,536. The method illustrated in FIG. 4 employs M×(N+1) frames to transfer M×N 16-bit blocks of data from the leader device to the target follower device, where M is a positive integer. (When M equals 1, the method illustrated in FIG. 4 is identical to the method illustrated in FIG. 3.) The M×(N+1) frames consist of M address frames and M×N write frames. This can be contrasted with conventional indirect write transactions, which employ 2×M×N frames to transfer M×N 16-bit blocks of data. The lower limit on the size of the bulk data to be transferred is two 16-bit blocks of data. That is, N is a positive integer between 2 and 65,536 (expressed as $2 \leq N \leq 65,536$), and M is a positive integer greater than or equal to 1. With this constraint on the size of the bulk data, the method illustrated in FIG. 4 will transfer bulk data from the leader device to the target follower device more quickly and more efficiently than conventional indirect write transactions.

Any reduction in the number of frames employed to transfer data results in a quicker, more efficient transfer of the data.

FIG. 2 is a flowchart illustration of a method for bulk data transfer from a leader device to a single target register of a target follower device. In this method, the single target register serves as a 16-bit buffer to temporarily store one block at a time of the bulk data.

To start, the leader device transmits on the MDIO data signal 108 an address frame that specifies the target follower device and that contains the address of the single target register (202). The leader device proceeds to transmit on the MDIO data signal 108 multiple write frames that specify the target follower device, the multiple write frames transmitted one at a time, each write frame containing a different block of the bulk data. Starting with an initial block (204), the leader device transmits on the MDIO data signal 108 a write frame that specifies the target follower device and that contains the initial block of the bulk data (206). The leader device then advances to the next block of the bulk data (208), and transmits on the MDIO data signal 108 a write frame that specifies the target follower device and that contains the next block of the bulk data (206). The acts of advancing to the next block (208) and transmitting a write frame that contains the next block (206) are repeated until a write frame that specifies the target follower device and that contains the final block of the bulk data has been transmitted on the MDIO data signal 108. Once the final block of the bulk data has been transmitted on the MDIO data signal 108 (210), the method ends. The leader device parts of the method illustrated in FIG. 2 are performed by the processor 109 while executing the MDIO driver 113.

Notably, the leader device transmits on the MDIO data signal 108 a write frame that specifies the target follower device and that contains the next block of the bulk data (206) prior to transmitting on the MDIO data signal 108 an address frame that specifies the target follower device other than the address frame transmitted at the start of the method (202). Stated differently, between transmissions of the multiple write frames that specify the target follower device and that contain respective blocks of the bulk data (206), the leader device refrains from transmitting on the MDIO data signal 108 any address frame that specifies the target follower device.

The target follower device, responsive to sampling the address frame on the MDIO data signal 108 (212), stores the address contained in the address frame (which is the address of the single target register) in a dedicated address register (214). The target follower device, responsive to sampling the write frame on the MDIO data signal 108 (216), writes the block of the bulk data contained in the write frame to the register whose address is stored in the dedicated address register (218), that is, to the single target register. The target follower device then copies the contents of the single target register to another memory location (220). The other memory location may be internal to the target follower device, for example, a location in the memory 124, or external to the target follower device. The acts of sampling the write frame (216), writing the block of the bulk data to the single target register (218), and copying the contents of the single target register to another memory location (220) are repeated for each block of the bulk data. The acts of sampling the address frame (212), storing the address (214), sampling the write frame (216), and writing the block to the single target register (218) are performed by the follower MDIO interface 114. The act of copying the contents of the single target register to another memory location (220) is performed by the processor 123.

If the leader device transmits on the MDIO data signal 108 a new write frame that specifies the target follower device before the contents of the single target register are copied to the other memory location, then the contents of the single target register will be updated with the block contained in the new write frame (assuming that no intervening address frame that specifies the target follower device has been sampled on the MDIO data signal 108). To avoid this occurrence, the target follower device copies the contents of the single target register to the other memory location before the leader device transmits on the MDIO data signal 108 a new write frame that specifies the target follower device (assuming that no intervening address frame that specifies the target follower device has been sampled on the MDIO data signal 108). It is expected that the speed at which the target follower device copies the contents of the single register to another memory location that is internal to the target follower device is faster than the speed at which the leader device transmits a write frame on the MDIO data signal 108.

FIG. 3 is a flowchart illustration of a method for bulk data transfer from a leader device to N target registers of a target follower device, where N is a positive integer.

To start, the leader device transmits on the MDIO data signal 108 an address frame that specifies the target follower device and that contains the address of an initial register (302). The leader device proceeds to transmit on the MDIO data signal 108 multiple write frames that specify the target follower device, the multiple write frames transmitted one at a time, each write frame containing a different block of the bulk data. Starting with an initial block (304), the leader device transmits on the MDIO data signal 108 a write frame that specifies the target follower device and that contains the initial block of the bulk data (306). The leader device then advances to the next block of the bulk data (308), and transmits on the MDIO data signal 108 a write frame that specifies the target follower device and that contains the next block of the bulk data (306). The acts of advancing to the next block (308) and transmitting a write frame that contains the next block (306) are repeated until a write frame that specifies the target follower device and that contains the final block of the bulk data has been transmitted on the MDIO data signal 108. Once the final block of the bulk data has been transmitted on the MDIO data signal 108 (310), the method ends. The leader device parts of the method illustrated in FIG. 3 are performed by the processor 109 while executing the MDIO driver 113.

Notably, the leader device transmits on the MDIO data signal 108 a write frame that specifies the target follower device and that contains the next block of the bulk data (306) prior to transmitting on the MDIO data signal 108 an address frame that specifies the target follower device other than the address frame transmitted at the start of the method (302). Stated differently, between transmissions of the multiple write frames that specify the target follower device and that contain respective blocks of the bulk data (306), the leader device refrains from transmitting on the MDIO data signal 108 any address frame that specifies the target follower device.

The target follower device, responsive to sampling the address frame on the MDIO data signal 108 (312), stores the address contained in the address frame (which is the address of the initial register) in a dedicated address register (314). The target follower device, responsive to sampling the write frame on the MDIO data signal 108 (316), writes the block of the bulk data contained in the write frame to the register whose address is stored in the dedicated address register (318) and increments the address in the dedicated address register to the address of the next register (320). The acts of sampling the write frame (316), writing the block of the bulk data to the register whose address is stored in the dedicated address register (318), and incrementing the address in the dedicated address register (320), are repeated for each block of the bulk data. The acts of sampling the address frame (312), storing the address (314), sampling the write frame (316), writing the block to the target register (318), and incrementing the address in the dedicated address register (320) are performed by the follower MDIO interface 114.

Notably, the target follower device updates the address in the dedicated address register (320) despite not having sampled on the MDIO data signal 108 another address frame that specifies the target follower device. That is, prior to sampling on the MDIO data signal 108 an address frame that specifies the target follower device other than the address frame transmitted (302) and sampled (312) at the start of the method, the target follower device updates the dedicated address register with the address of a different register that is not the initial register (320). Stated differently, the target follower device increments the address in the dedicated address register (320) responsive to sampling a write frame on the MDIO data signal 108 that specifies the target follower device (316). That is, the target follower device implements a post-write-increment-address action, despite the absence of any definition in Clause 45 of IEEE Std 802.3-2015 of a post-write-increment-address frame.

FIG. 4 is a flowchart illustration of a method for bulk data transfer over a bus from a leader device to N target registers of a target follower device, where N is a positive integer. In this method, the N target registers serve as a buffer of size 16×N bits to temporarily store N blocks of the bulk data.

To start, the leader device partitions the bulk data into M portions, where M is a positive integer greater than 2, and a size of each portion does not exceed the capacity of the buffer (402).

Starting with an initial portion (404), the leader device performs a sub-method (406) then advances to the next portion of the bulk data (408). The acts of advancing the next portion of the bulk data (408) and performing the sub-method (406) are repeated until the sub-method is performed for the final portion of the bulk data. Once the sub-method has been performed for the final portion of the bulk data (410), the method ends.

The sub-method is performed once for each portion of the bulk data. That is, the sub-method is performed M times. In the event that M is equal to 1, there is only one portion, the bulk data is not partitioned into multiple portions, and the method of FIG. 4 is identical to the method of FIG. 3.

For a given portion of the bulk data, the leader device transmits on the MDIO data signal 108 an address frame that specifies the target follower device and that contains the address of an initial register (412). The leader device proceeds to transmit on the MDIO data signal 108 multiple write frames that specify the target follower device, the multiple write frames transmitted one at a time, each write frame containing a different block of the given portion of the bulk data. Starting with an initial block (414) of the given portion of the bulk data, the leader device transmits on the MDIO data signal 108 a write frame that specifies the target follower device and that contains the initial block of the given portion of the bulk data (416). The leader device then advances to the next block of the given portion of the bulk data (418), and transmits on the MDIO data signal 108 a write frame that specifies the target follower device and that contains the next block of the given portion of the bulk data (416). The acts of advancing to the next block of the given portion (418) and transmitting a write frame that contains the next block (418) are repeated until a write frame that specifies the target follower device and that contains the final block of the given portion of the bulk data has been transmitted on the MDIO data signal 108. Once the final block of the given portion of the bulk data has been transmitted on the MDIO data signal 108 (420), the leader device advances to the next portion of the bulk data (408), unless the final block of the final portion of the bulk data has been transmitted on the MDIO data signal 108, in which case the method ends. The leader device parts of the method illustrated in FIG. 4 are performed by the processor 109 while executing the MDIO driver 113. The act of partitioning bulk data into portions (402) is performed by the processor 109 while executing the MDIO driver 113 and additional instructions.

Notably, the leader device transmits on the MDIO data signal 108 a write frame that specifies the target follower device and that contains the next block of the given portion of the bulk data (418) prior to transmitting on the MDIO data signal 108 an address frame that specifies the target follower device other than the address frame transmitted at the start of the sub-method (412). Stated differently, between transmissions of the multiple write frames that specify the target follower device and that contain respective blocks of the given portion of the bulk data (418), the leader device refrains from transmitting on the MDIO data signal 108 any address frame that specifies the target follower device.

The target follower device, responsive to sampling the address frame on the MDIO data signal 108 (422), stores the address contained in the address frame (which is the address of the initial register) in a dedicated address register (424). The target follower device, responsive to sampling the write frame on the MDIO data signal 108 (426), writes the block of the given portion of the bulk data contained in the write frame to the register whose address is stored in the dedicated address register (428) and increments the address in the dedicated address register to the address of the next register in the buffer (430). The acts of sampling the write frame (426), writing the block of the given portion of the bulk data to the register whose address is stored in the dedicated address register (428), and incrementing the address in the dedicated address register (430), are repeated for each block of the bulk data. The acts of sampling the address frame (422), storing the address (424), sampling the write frame (426), writing the block to the target register (428), and incrementing the address in the dedicated address register (430) are performed by the follower MDIO interface 114.

Notably, the target follower device updates the address in the dedicated address register (430) despite not having sampled on the MDIO data signal 108 another address frame that specifies the target follower device. That is, prior to sampling on the MDIO data signal 108 an address frame that specifies the target follower device other than the address frame transmitted (412) and sampled (422) at the start of the sub-method, the target follower device updates the dedicated address register with the address of a different register that is not the initial register (430). Stated differently, the target follower device increments the address in the dedicated address register (430) responsive to sampling a write frame on the MDIO data signal 108 that specifies the target follower device (426). That is, the target follower device implements a post-write-increment-address action, despite the absence of any definition in Clause 45 of IEEE Std 802.3-2015 of a post-write-increment-address frame.

To avoid the contents of a particular target register being updated with the corresponding block of a next portion of the bulk data, the target follower device copies those contents to another memory location (432). The other memory location may be internal to the target follower device, for example, a location in the memory 124, or external to the target follower device. For example, the target follower device may copy the contents of the entire buffer (all N target registers) to another memory location once the final block of a given portion of the bulk data has been written to the Nth target register. This act of copying the contents of the entire buffer is completed before the leader device transmits the first block of the next portion of the bulk data. In another example, the target follower device may employ pipelining, where the contents of some of the target registers of the buffer are copied to another memory location while new contents are being written to other target registers of the buffer. That is, partial contents of the buffer are copied in a pipelined matter so that eventually all contents are copied to the other memory location without disrupting or delaying the transmission of blocks of the next portion of the bulk data. The act of copying the contents of the buffer to another memory location (432) is performed by the processor 123.

Figure 5:
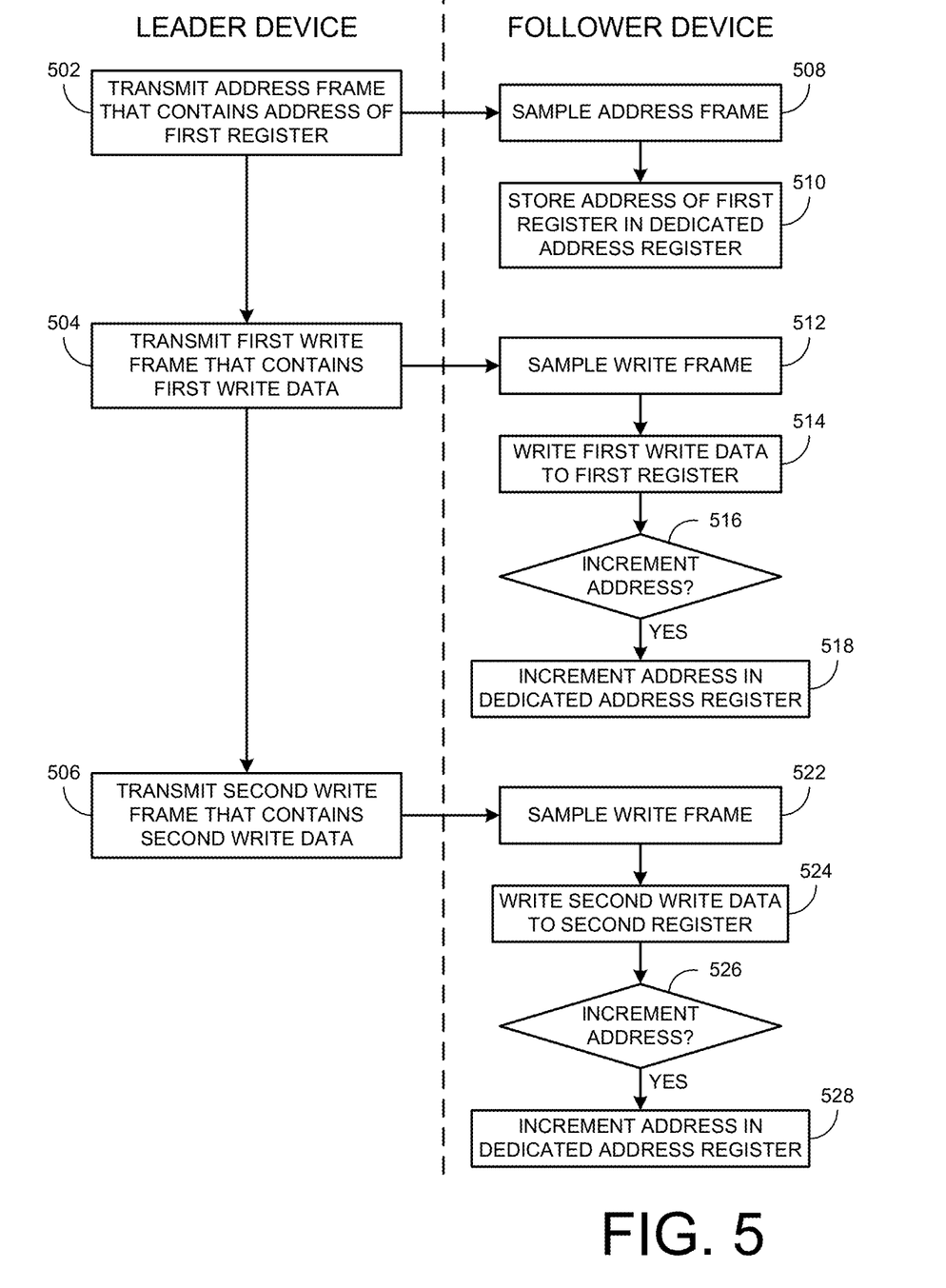
FIG. 5 is a flowchart illustration of a method for data transfer over a bus from a leader device to a target follower device.

The methods illustrated in FIG. 3 and in FIG. 4 involve the target follower device incrementing the address in the dedicated address register. More generally, this document proposes implementing a write-increment function using frames that are compatible with Clause 45 of IEEE Std 802.3-2015. The automatic increment of the dedicated address register is implemented by the target follower device based on a property of the target follower device and regardless of the content of any write frame. FIG. 5 is a flowchart illustration of a method for data transfer over a bus from a leader device to a target follower device. The bus and the frames are compatible with Clause 45 of IEEE Std 802.3-2015. Therefore, if the leader device is compatible with Clause 45 of IEEE Std 802.3-2015, implementation of the method illustrated in FIG. 5 will not make the leader device incompatible with Clause 45 IEEE Std 802.3-2015. Similarly, if the target follower device is compatible with Clause 45 of IEEE Std 802.3-2015, implementation of the method illustrated in FIG. 5 will not make the target follower device incompatible with Clause 45 IEEE Std 802.3-2015.

To start, the leader device transmits on the MDIO data signal 108 an address frame that specifies the target follower device and that contains the address of a first register (502). The leader device transmits on the MDIO data signal 108 a first write frame that specifies the target follower device and that contains first write data (504). The leader device subsequently transmits on the MDIO data signal 108 a second write frame that specifies the target follower device and that contains second write data (506). The leader device parts of the method illustrated in FIG. 5 are performed by the processor 109 while executing the MDIO driver 113.

Notably, the leader device transmits the second write frame on the MDIO data signal 108 (506) prior to transmitting on the MDIO data signal 108 an address frame that specifies the target follower device other than the address frame transmitted at the start of the method (502). Stated differently, between transmissions of the first write frame (504) and the second write frame (506), both of which specify the target follower device, the leader device refrains from transmitting on the MDIO data signal 108 any address frame that specifies the target follower device.

The target follower device, responsive to sampling the address frame on the MDIO data signal 108 (508), stores the address contained in the address frame (which is the address of the first register) in a dedicated address register (510). The target follower device, responsive to sampling the first write frame on the MDIO data signal 108 (512), writes the first write data contained in the first write frame to the register whose address is stored in the dedicated address register (514) and, if the address stored in the dedicated address register (which is the address of the first register) is incrementable (516), increments the address in the dedicated address register to the address of a second, different register (518). The target follower device, responsive to sampling the second write frame on the MDIO data signal 108 (522), writes the second write data contained in the second write frame to the register whose address is stored in the dedicated address register (which is the address of the second register) (524) and, if the address stored in the dedicated address register (which is the address of the second register) is incrementable (526), increments the address in the dedicated address register to the address of a third, different register (528). The follower device parts of the method illustrated in FIG. 5 are performed by the follower MDIO interface 114.

Notably, the target follower device updates the address in the dedicated address register (518, 528) despite not having sampled on the MDIO data signal 108 another address frame that specifies the target follower device. That is, prior to sampling on the MDIO data signal 108 an address frame that specifies the target follower device other than the address frame transmitted (502) and sampled (508) at the start of the method, the target follower device updates the dedicated address register with the address of a different register that is not the first register (518, 528). Stated differently, the target follower device increments the address in the dedicated address register (518, 528) responsive to sampling a write frame on the MDIO data signal 108 that specifies the target follower device (512, 522). That is, the target follower device implements a post-write-increment-address action, despite the absence of any definition in Clause 45 of IEEE Std 802.3-2015 of a post-write-increment-address frame.

The above description makes reference to the concept of an address being incrementable.

The target follower device may be programmed or designed or configured or hard-wired such that every address that is storable in the dedicated address register is incrementable. That is, it may be the default behavior of the target follower device, responsive to sampling a write frame on the MDIO data signal 108 that specifies the target follower device, to write data in the write frame to the register whose address is stored in the dedicated address register and subsequently to increment the address in the dedicated address register. This default behavior may be documented in a technical specification of the target follower device. The leader device may be able to determine that the target follower device has this default behavior by having the processor 109 execute instructions to obtain from the target follower device identifying information (such as, for example, one or more of manufacturer code, model number, and serial number) and comparing the identifying information to stored information known to identify follower devices having this default behavior.

Alternatively, an address may be incrementable if a control bit associated with the address has a prescribed value, say the value '1'. For example, the target follower device may contain one or more control registers the control bits of which are associated with respective addresses of 16-bit registers that are accessible by the bus. The leader device may determine that a control bit has the prescribed value by having the processor 109 execute instructions to read the contents of a control register. Additionally or alternatively, the leader device may determine that a control bit has the prescribed value by having the processor 109 execute instructions to instruct the target follower device to write the prescribed value to the control bit. Additionally or alternatively, the leader device may determine that a control bit has the prescribed value by virtue of that fact being defined in the technical specifications of the target follower device. In this latter case, the processor 109 may execute instructions to obtain from the target follower device identifying information (such as, for example, one or more of manufacturer code, model number, and serial number) and to compare the identifying information to stored information known to identify follower devices whose technical specifications define that the control bit has the prescribed value.

Alternatively, an address may be incrementable if the address is within a prescribed range of addresses. That is, the target follower device, responsive to sampling a write frame on the MDIO data signal 108 that specifies the target follower device, may increment the address in the dedicated address register only if the address in the dedicated address register is within the prescribed range of addresses and may refrain from incrementing the address in the dedicated address register if the address in the dedicated address register is not within the prescribed range of addresses. The prescribed range of addresses may be stored in one or more particular control registers of the target follower device. The leader device may determine that an address is within the prescribed range of addresses by having the processor 109 execute instructions to read the contents of the one or more particular control registers. Additionally or alternatively, the leader device may determine that an address is within the prescribed range of addresses by having the processor 109 execute instructions to instruct the target follower device to write the prescribed range of address to the one or more particular control registers. Additionally or alternatively, the leader device may determine that an address is within the prescribed range of addresses by virtue of that fact being defined in the technical specifications of the target follower device. In this latter case, the processor 109 may execute instructions to obtain from the target follower device identifying information (such as, for example, one or more of manufacturer code, model number, and serial number) and to compare the identifying information to stored information known to identify follower devices whose technical specifications define that the prescribed range of addresses are incrementable.

The methods illustrated in FIG. 3 and FIG. 4 involve automatic incrementation of the address in the dedicated address register responsive to sampling a write frame. Incrementing the address in the dedicated address register (320, 430) may result from any deterministic property of the target follower device. The property is deterministic because it can be determined. A leader device may be able to determine the deterministic property. One example of the deterministic property of the target follower device is that all addresses that are accessible via the bus are incrementable, that is, incrementing the address is default behavior of the target follower device as described above. Another example of the deterministic property of the target follower device is that all control bits associated with all addresses of the N target registers have the prescribed value, the control bits being stored in one or more control registers of the target follower device as described above. A further example of the deterministic property of the target follower device is that all addresses of the N target registers are within the prescribed range of addresses, as described above.

Although the above description refers to the concept of an address being incrementable, it is contemplated that the address could be decrementable. That is, the buffer of the registers 116 may be loaded backwards instead of forwards.

Any other deterministic address manipulation is also contemplated. In the claims, the term "incrementable" includes incrementable, decrementable, and any other deterministic address manipulation.

The scope of the claims should not be limited by the details set forth in the examples, but should be given the broadest interpretation consistent with the description as a whole.

What is claimed is:

1. A method for data transfer, the method comprising:
partitioning M×N 16-bit blocks of data into M portions, each portion having N 16-bit blocks of data, where M is a positive integer greater than or equal to 2 and N is a positive integer greater than or equal to 2 and less than or equal to 65,536; and
for each of the M portions, using a single address frame and N write frames to transfer the N 16-bit blocks of data over a bus from a leader device to a follower device,
wherein the bus, the address frames, and the write frames are compatible with Clause 45 of IEEE Std 802.3-2015.

2. A follower device comprising:
multiple registers;
a dedicated address register operative to store an address of one of the multiple registers; and
a Management Data Input/Output (MDIO) interface coupled to a clock signal and to a MDIO data signal,
wherein the MDIO interface is operative to
sample on the MDIO data signal a write frame that specifies the follower device and that contains data; and
responsive to sampling the write frame on the MDIO data signal
write the data contained in the write frame to a first register whose address is stored in the dedicated address register; and
responsive to the address of the first register being incrementable and despite not having sampled on the MDIO data signal an address frame that specifies the follower device since the sampling of the write frame on the MDIO data signal, update the dedicated address register to store the address of a second register, where the address of the second register is different from the address of the first register,
wherein the clock signal, the MDIO data signal, and the write frame are compatible with Clause 45 of IEEE Std 802.3-2015.

3. The follower device as recited in claim 2, further comprising a control register, wherein a control bit of the register corresponds to the address of the first register, and the address of the first register is incrementable because the control bit has a prescribed value.

4. The follower device as recited in claim 2, wherein the address of the first register is incrementable because the address of the first register is within a prescribed range of addresses.

5. The follower device as recited in claim 2, wherein the MDIO interface is operative to
prior to sampling the write frame on the MDIO data signal:
sample on the MDIO data signal an address frame that specifies the follower device and that contains the address of the first register; and
responsive to sampling the address frame on the MDIO data signal, store the address of the first register in the dedicated address register, wherein the address frame is compatible with Clause 45 of IEEE Std 802.3-2015.

6. The follower device as recited in claim 2, wherein the address of the first register is incrementable because every address that is storable in the dedicated address register is incrementable.

7. A leader device comprising:
a processor;
a random-access memory coupled to the processor, the random-access memory storing first write data and second write data;
a Management Data Input/Output (MDIO) interface coupled to the processor, the MDIO interface coupled to a clock signal and to a MDIO data signal; and
a read-only memory coupled to the processor, the read-only memory storing a MDIO driver for the MDIO interface;
wherein the processor, when executing the MDIO driver, is operative to operate the MDIO interface to:
transmit on the MDIO data signal an address frame that specifies a follower device and that contains an address of a register;
transmit on the MDIO data signal a first write frame that specifies the follower device and that contains the first write data; and
due to a property of the follower device, prior to transmitting on the MDIO data signal any other address frame that specifies the follower device, transmit on the MDIO data signal a second write frame that specifies the follower device and that contains the second write data,
wherein the clock signal, the MDIO data signal, the address frame, the first write frame, and the second write frame are compatible with Clause 45 of IEEE Std 802.3-2015.

8. The leader device as recited in claim 7, wherein the processor is operative to execute instructions to obtain from the follower device identifying information and to compare the identifying information to stored information known to identify follower devices whose technical specifications define that the follower device has the property.

9. The leader device as recited in claim 7, wherein the property is that the address of the register is incrementable where a control bit associated with the address of the register has a prescribed value, and the processor is operative to execute instructions to instruct the follower device to write the prescribed value to the control bit.

10. The leader device as recited in claim 7, wherein the property is that the address of the register is incrementable where a control bit associated with the address of the register has a prescribed value, and the processor is operative to execute instructions to read content of the control bit and to determine that the content of the control bit is identical to the prescribed value.

11. The leader device as recited in claim 7, wherein the property is that all addresses within a prescribed range are incrementable, and the processor is operative to execute instructions to instruct the follower device to write the prescribed range of addresses to one or more control registers of the follower device.

12. The leader device as recited in claim 7, wherein the property is that all addresses within a prescribed range are incrementable, and the processor is operative to execute instructions to read content of one or more control registers and to determine that the content is identical to the prescribed range.

* * * * *